United States Patent
Higashiyama et al.

(10) Patent No.: US 11,588,565 B2
(45) Date of Patent: Feb. 21, 2023

(54) NETWORK SYSTEM THAT FACILITATES DEVICE RECOGNITION IN A HIGH-FREQUENCY COMMUNICATION ENVIRONMENT

(71) Applicant: DAIKIN INDUSTRIES, LTD., Osaka (JP)

(72) Inventors: Shin Higashiyama, Osaka (JP); Hiroshi Dohmae, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 17/599,222

(22) PCT Filed: Mar. 24, 2020

(86) PCT No.: PCT/JP2020/013127
§ 371 (c)(1),
(2) Date: Sep. 28, 2021

(87) PCT Pub. No.: WO2020/203493
PCT Pub. Date: Oct. 8, 2020

(65) Prior Publication Data
US 2022/0103275 A1 Mar. 31, 2022

(30) Foreign Application Priority Data
Mar. 29, 2019 (JP) .............................. JP2019-067793

(51) Int. Cl.
*H04J 1/12* (2006.01)
*H04L 41/0893* (2022.01)

(52) U.S. Cl.
CPC ............ *H04J 1/12* (2013.01); *H04L 41/0893* (2013.01)

(58) Field of Classification Search
CPC ............................... H04J 1/12; H04L 41/0893
See application file for complete search history.

(56) References Cited

U.S. PATENT DOCUMENTS

2016/0007267 A1   1/2016   Watt et al.
2018/0160315 A1*  6/2018   Bennett ................. H01Q 13/20
(Continued)

FOREIGN PATENT DOCUMENTS

CN   103607222 A  *  2/2014   ............ H04B 3/544
JP   2006-29642 A     2/2006
(Continued)

OTHER PUBLICATIONS

International Preliminary Report on Patentability and English translation of the Written Opinion of the International Searching Authority for International Application No. PCT/JP2020/013127, dated Oct. 14, 2021.
(Continued)

*Primary Examiner* — Jackie Zuniga Abad
(74) *Attorney, Agent, or Firm* — Birch, Stewart, Kolasch & Birch, LLP

(57) ABSTRACT

System recognition is performed on devices connected to an identical system without recognizing a device of a different system as a device of the identical system in high-frequency communication. In a device network system, in a state in which a first device group is set in advance as a physically connectable system or in a state in which the first device group is recognized as a physically connectable system, in a case where the first device group or a second device detects occurrence of a state in which the second device outside the system is recognized as belonging to the system, the first device group or the second device causes the second device to leave the system. As a result, a network can be normally maintained even in high-frequency communication.

5 Claims, 11 Drawing Sheets

(56) References Cited

U.S. PATENT DOCUMENTS

| | | | | |
|---|---|---|---|---|
| 2018/0202682 A1* | 7/2018 | Park | ............................ | F24F 11/58 |
| 2018/0338290 A1* | 11/2018 | Tashiro | ..................... | F24F 11/89 |
| 2019/0342172 A1* | 11/2019 | Bower, III | ........... | H04L 41/0803 |
| 2020/0204447 A1* | 6/2020 | Chow | ................. | G06F 13/4221 |

FOREIGN PATENT DOCUMENTS

| | | |
|---|---|---|
| JP | 2012-52706 A | 3/2012 |
| JP | 2016-219983 A | 12/2016 |
| WO | WO 2014/144753 A1 | 9/2014 |

OTHER PUBLICATIONS

International Search Report (PCT/ISA/210) issued in PCT/JP2020/013127, dated Jun. 16, 2020.
Extended European Search Report dated Apr. 13, 2022 issued in corresponding European Application No. 20782193.5.

* cited by examiner

NETWORK SYSTEM THAT FACILITATES DEVICE RECOGNITION IN A HIGH-FREQUENCY COMMUNICATION ENVIRONMENT

TECHNICAL FIELD

The present disclosure relates to a device network system that performs high-frequency communication.

BACKGROUND ART

In an existing multi-air conditioner for a building, an indoor unit/outdoor unit connection line and an inter-system connection line are separately connected, and at the time of recognizing an indoor unit/outdoor unit system, the inter-system connection line is disconnected by a relay to create a state in which only indoor units and outdoor units of an identical system are present in a network, for the purpose of identifying the indoor units and the outdoor units of the identical system.

SUMMARY OF INVENTION

Technical Problem

However, in a case of performing communication by changing a communication scheme to a scheme of using a higher-frequency signal to increase a communication speed, disconnection by a relay according to a conventional method may cause crosstalk in which signals mutually leak due to a parasitic capacitance between contacts of the relay or substrate patterns and may cause coupling of networks divided by the relay. Thus, the relay does not fulfill the function in high-frequency communication. When communication lines of different networks that are not connected by a physical line are parallel to each other and a parasitic capacitance or mutual induction between the communication lines causes mutual leakage of signals and crosstalk, the networks that are not physically connected may couple to each other. When such crosstalk occurs, a device of a different network that is not physically connected may be recognized as a device of an identical system in a process of performing system recognition of a network by communication as in the conventional method.

Accordingly, there is an issue of establishing means for appropriately performing system recognition on devices connected to an identical system without recognizing a device of a different system as a device of the identical system in high-frequency communication.

Solution to Problem

A device network system according to a first aspect includes a first network and a second network. The first network includes a first device group and a first line group. The first device group includes a plurality of devices. The first line group is connected to the plurality of devices. The second network includes a second device and a second line connected to the second device. The second device is physically separated from the first network. In a state in which the first device group is set in advance as a physically connectable group or in a state in which the first device group is recognized as a physically connectable group, in a case where the first device group or the second device detects occurrence of a state in which the second device is recognized as belonging to the physically connectable group, the first device group or the second device performs an action under an assumption that the second device does not belong to the physically connectable group.

In this device network system, in a case where a device that is not to belong to a group is recognized as belonging to the group, an action is performed under an assumption that the device does not belong to the group. Thus, system recognition is appropriately performed even in high-frequency communication.

A device network system according to a second aspect is the device network system according to the first aspect, in which, in the first device group, a main device selected from among the plurality of devices determines whether the state in which the second device is recognized as belonging to the physically connectable group has occurred.

A device network system according to a third aspect is the device network system according to the first aspect or the second aspect, in which, in the first device group, a main device selected from among the plurality of devices determines, using low-frequency communication, whether the plurality of devices except for the main device belong to the physically connectable group.

A device network system according to a fourth aspect is the device network system according to any one of the first aspect to the third aspect, in which the action performed by the first device group or the second device under the assumption that the second device does not belong to the physically connectable group includes an action of denying belonging of the second device to the physically connectable group.

A device network system according to a fifth aspect is the device network system according to the fourth aspect, in which, in the first device group, a main device selected from among the plurality of devices denies belonging of the second device to the physically connectable group.

DESCRIPTION OF EMBODIMENTS (1) Overview of Device Network System

Figure 1A:
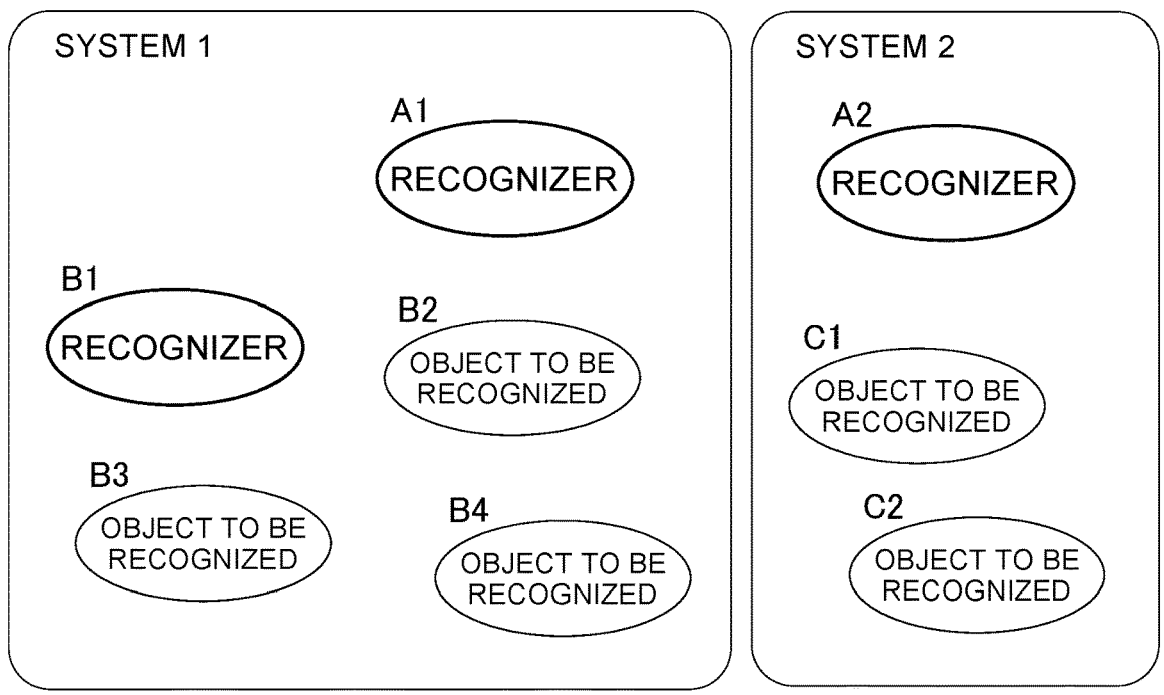
FIG. 1A is a conceptual diagram of system recognition.
Figure 1A:
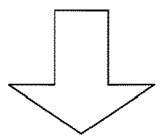
Figure 1A:
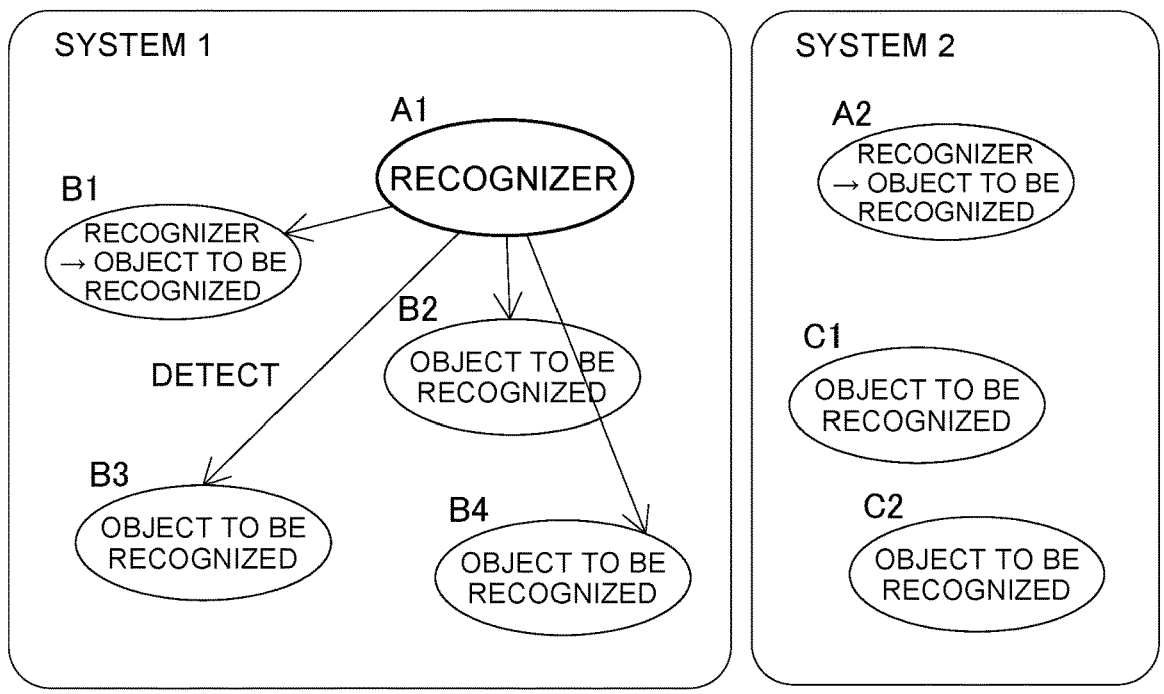

FIG. 1A is a conceptual diagram of system recognition. In FIG. 1A, there are devices A1, A2, B1, B2, B3, B4, C1, and C2, all of which belong to one communication network and are capable of communicating with each other. A system 1 is a system to which the devices A1, B1, B2, B3, and B4 belong. A system 2 is a system to which the devices A2, C1, and C2 belong. In an initial state, each device is unable to grasp the system to which the device belongs, and needs to identify the system to which the device belongs by system recognition. To implement system recognition, it is necessary to determine the role in the network of the device serving as a recognition target. The devices in the network include a device serving as a "recognizer" and a device serving as an "object to be recognized", which are initial roles. For example, the "recognizer" corresponds to an outdoor unit or a centralized controller, whereas the "object to be recognized" corresponds to an indoor unit.

(1-1) Procedure of System Recognition

Figure 1B:
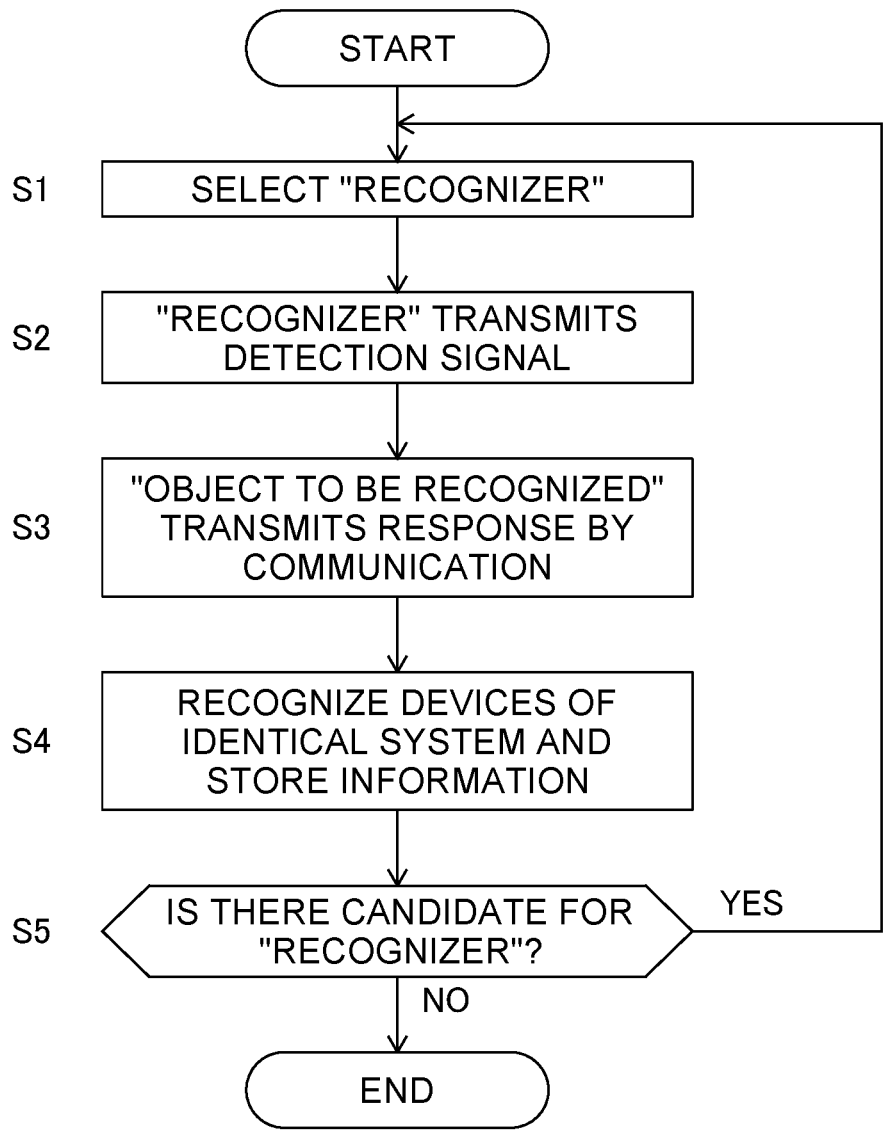
FIG. 1B is a flowchart of system recognition.

FIG. 1B is a flowchart of system recognition. Hereinafter, a procedure of system recognition will be described with reference to FIG. 1A and FIG. 1B. As illustrated in an upper part of FIG. 1A, the system 1 includes two devices A1 and B1 that can serve as a "recognizer", which is a recognizing side. On the other hand, the system 2 includes one device A2 that can serve as a "recognizer".

(Step S1)

One "recognizer" is selected from among the three devices A1, B1, and A2 by communication. A selection method may be, for example, a method of referring to unique IDs or communication addresses of the respective devices and determining the device having the smallest value to be a "recognizer".

If the device A1 is selected as a "recognizer", the devices B1 and A2 that are not selected as a "recognizer" temporarily become "objects to be recognized" (see a lower part of FIG. 1A).

(Step S2)

After the devices B1 and A2 have shifted to "objects to be recognized", the device A1 serving as a "recognizer" transmits a detection signal for system recognition to the devices B1, B2, B3, and B4 serving as "objects to be recognized".

At this time, the detection signal must not be transmitted to the devices A2, C1, and C2 of the system 2, which is a different system, but the detection signal is transmitted only to the devices B1, B2, B3, and B4 of the system 1, which is the identical system.

(Step S3)

The devices B1, B2, B3, and B4 serving as "objects to be recognized" that have received the detection signal each transmit a response by communication.

(Step S4)

The device A1 serving as a "recognizer" recognizes that the devices B1, B2, B3, and B4 serving as "objects to be recognized" from which responses have been received are devices belonging to the identical system, and stores information thereof.

(Step S5)

The device A1 that has already been selected as a "recognizer" and the device B1 that has shifted to an "object to be recognized" and has been recognized are excluded from candidates for the next "recognizer". The process from step S1 to step S4 is repeated until there is no candidate for the next "recognizer". As a result, the device composition of each system is grasped.

(1-2) Recognition of Multistage System Connection

Figure 2:
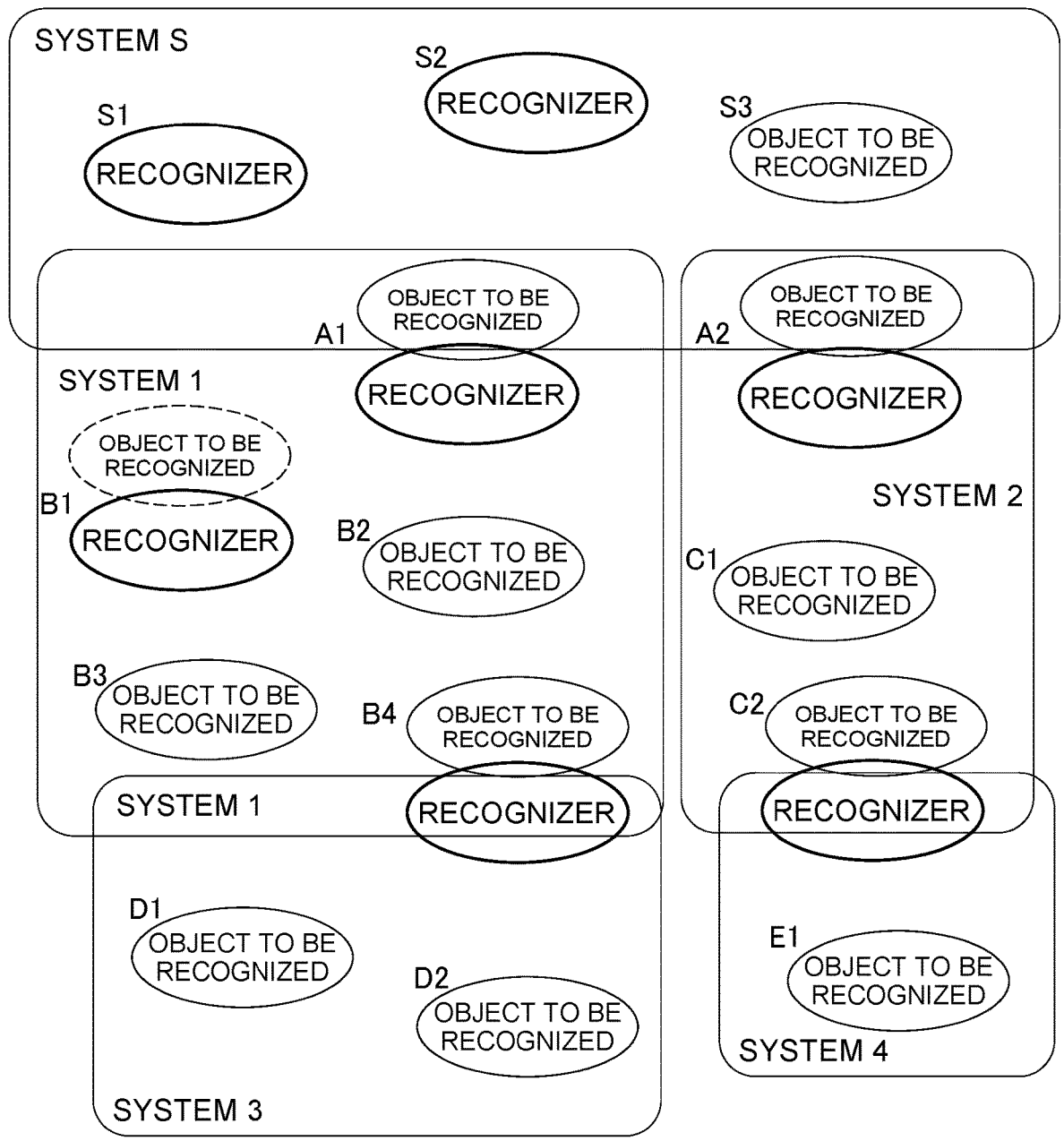
FIG. 2 is a conceptual diagram of system recognition in a case where systems are connected in a multistage manner.
Figure 3:
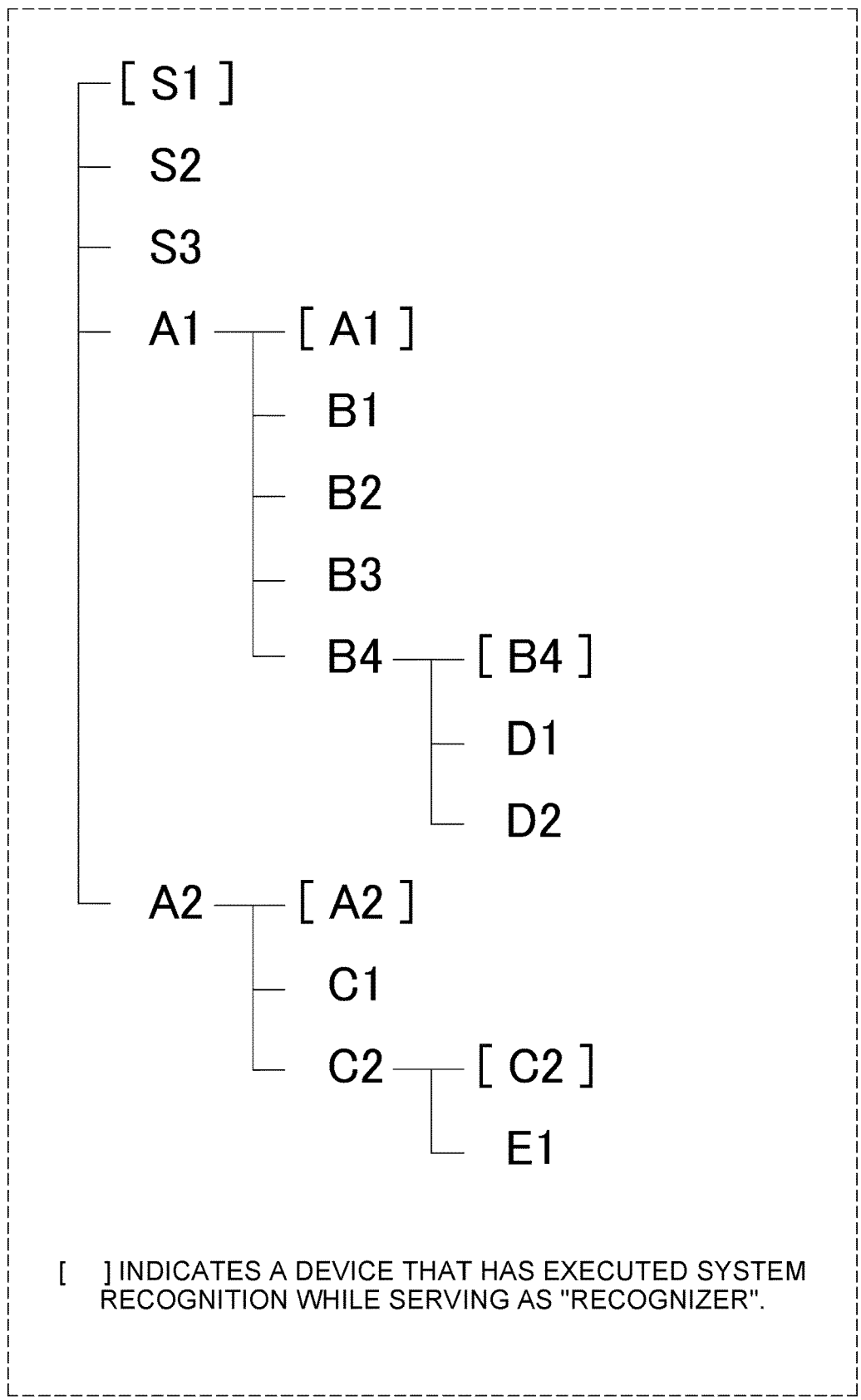
FIG. 3 is a system list created on the basis of the form in FIG. 2.

FIG. 2 is a conceptual diagram of system recognition in a case where systems are connected in a multistage manner. FIG. 3 is a system list created on the basis of the form in FIG. 2. In FIG. 2, there are two types of roles, a "recognizer" and an "object to be recognized". The systems are connected to each other by devices having, as a form of devices, both roles of a "recognizer" and an "object to be recognized", such as the devices A1, A2, B4, and C2. These devices each serve as an "object to be recognized" for an upstream side and serve as a "recognizer" for a downstream side. The system herein is not limited to a refrigerant system.

Specifically, the device A1 connects a system S and the system 1, and the device A2 connects the system S and the system 2. Also, the device B4 connects the system 1 and a system 3, and the device C2 connects the system 2 and a system 4.

Systems can be connected to each other at only one point on the upstream side. Coupling with a plurality of systems is possible on the downstream side.

(2) Application to Air Conditioning System

Figure 4:
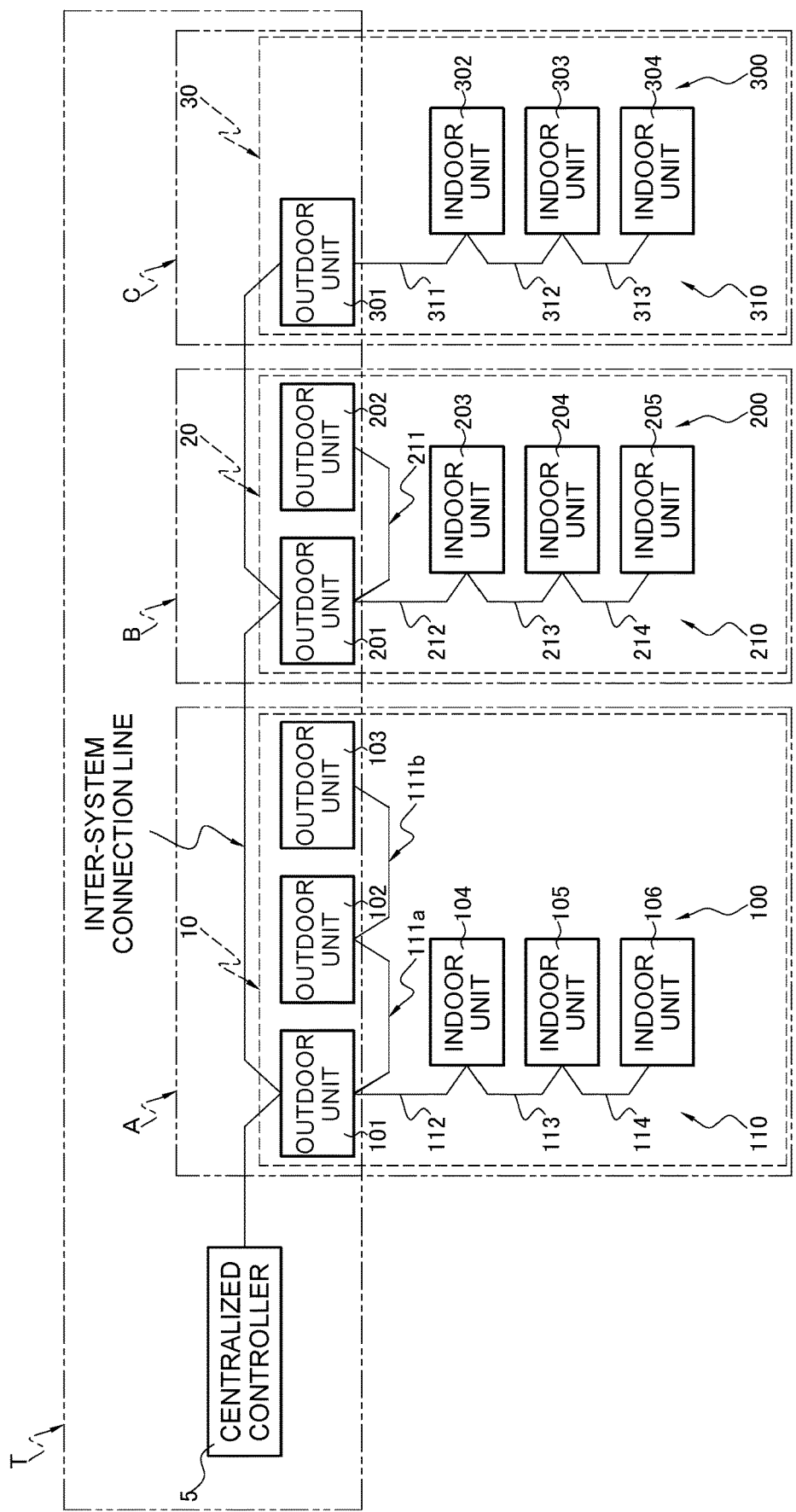
FIG. 4 is a configuration diagram of an air conditioning system including a plurality of refrigerant systems.

FIG. 4 is a configuration diagram of an air conditioning system including a plurality of refrigerant systems. In FIG. 4, the air conditioning system is constituted by outdoor units, indoor units, and a centralized controller. A system unit physically connected by refrigerant pipes is called a refrigerant system.

In a refrigerant system A, outdoor units 101, 102, and 103 and indoor units 104, 105, and 106 serving as devices are connected by lines 111a, 111b, 112, 113, and 114, and are connected by a line group 110.

In a refrigerant system B, outdoor units 201 and 202 and indoor units 203, 204, and 205 serving as devices are connected by lines 211, 212, 213, and 214, and are connected by a line group 210.

In a refrigerant system C, an outdoor unit 301 and indoor units 302, 303, and 304 serving as devices are connected by lines 311, 312, and 313, and are connected by a line group 310.

In a system T, the refrigerant systems A, B, and C are connected by an inter-system connection line and a centralized controller 5 is connected thereto, for the purpose of controlling the plurality of refrigerant systems A, B, and C.

All the devices form one communication network. Communication between the individual devices is performed using a high frequency of 100 kHz or more.

In system recognition, it is determined which of the systems A, B, C, and T the individual outdoor units and indoor units and the centralized controller belong to. Here, a description will be given of recognition of devices in the systems A, B, and C for simplifying the description. Note that recognition for the system T to which the centralized controller and the outdoor units belong is not different from a recognition process for the systems A to C.

One "recognizer" is selected from among all the outdoor units of the three refrigerant systems A, B, and C. For example, in FIG. 4, the refrigerant system A includes the three outdoor units 101, 102, and 103 that can be a "recognizer".

Also, the refrigerant system B includes the two outdoor units 201 and 202 that can be a "recognizer". Furthermore, the refrigerant system C includes the one outdoor unit 301 that can be a "recognizer".

One "recognizer" is selected from among the six outdoor units. System recognition may be started from any system. For the sake of convenience, a description will be given in order from the refrigerant system A.

(2-1) System Recognition in Refrigerant System A

For example, if the outdoor unit 101 is selected as a "recognizer", the outdoor units 102, 103, 201, 202, and 301 that are not selected as a "recognizer" temporarily become "objects to be recognized".

Subsequently, the outdoor unit 101 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the outdoor units 102 and 103 and the indoor units 104, 105, and 106 of the refrigerant system A, which is the identical system, and the detection signal must not be transmitted to the outdoor units 201, 202, and 301 and the indoor units 203, 204, 205, 302, 303, and 304 of the refrigerant systems B and C, which are different systems. Specifically, a high pass filter, for example, a capacitor, is inserted to the inter-system connection line side of the outdoor units, so as to achieve insulation in a low frequency manner and prevent the detection signal from being transmitted to the other systems.

Subsequently, the outdoor units 102 and 103 and the indoor units 104, 105, and 106 serving as "objects to be recognized" that have received the detection signal each transmit a response by communication.

The outdoor unit 101 serving as a "recognizer" recognizes that the outdoor units 102 and 103 and the indoor units 104, 105, and 106 serving as "objects to be recognized" from which responses have been received are devices belonging to the identical system, and stores information thereof.

(2-2) System Recognition in Refrigerant System B

The outdoor unit 101 of the refrigerant system A that has already been selected as a "recognizer" and the outdoor units 102 and 103 that have been recognized as belonging to the refrigerant system A are excluded from candidates for the next "recognizer", and thus one "recognizer" is selected from among the outdoor units 201, 202, and 301 of the two refrigerant systems B and C.

For example, if the outdoor unit 201 is selected as a "recognizer", the outdoor units 202 and 301 that are not selected as a "recognizer" temporarily become "objects to be recognized".

Subsequently, the outdoor unit 201 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the outdoor unit 202 and the indoor units 203, 204, and 205 of the refrigerant system B, which is the identical system, and the detection signal must not be transmitted to the outdoor units 101, 102, 103, and 301 and the indoor units 104, 105, 106, 302, 303, and 304 of the refrigerant systems A and C, which are different systems.

Subsequently, the outdoor unit 202 and the indoor units 203, 204, and 205 serving as "objects to be recognized" that have received the detection signal each transmit a response by communication.

The outdoor unit 201 serving as a "recognizer" recognizes that the outdoor unit 202 and the indoor units 203, 204, and 205 serving as "objects to be recognized" from which responses have been received are devices belonging to the identical system, and stores information thereof.

(2-3) System Recognition in Refrigerant System C

The outdoor unit 101 of the refrigerant system A and the outdoor unit 201 of the refrigerant system B that have already been selected as a "recognizer", the outdoor units 102 and 103 that have been recognized as belonging to the refrigerant system A, and the outdoor unit 202 that has been recognized as belonging to the refrigerant system B are excluded from candidates for the next "recognizer", and thus the outdoor unit 301 of the refrigerant system C serves as a "recognizer".

Subsequently, the outdoor unit 301 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the indoor units 302, 303, and 304 of the refrigerant system C, which is the identical system, and the detection signal must not be transmitted to the outdoor units 101, 102, 103, 201, and 202 and the indoor units 104, 105, 106, 203, 204, and 205 of the refrigerant systems A and B, which are different systems.

Subsequently, the indoor units 302, 303, and 304 serving as "objects to be recognized" that have received the detection signal each transmit a response by communication.

The outdoor unit 301 serving as a "recognizer" recognizes that the indoor units 302, 303, and 304 serving as "objects to be recognized" from which responses have been received are devices belonging to the identical system, and stores information thereof.

Figure 5:
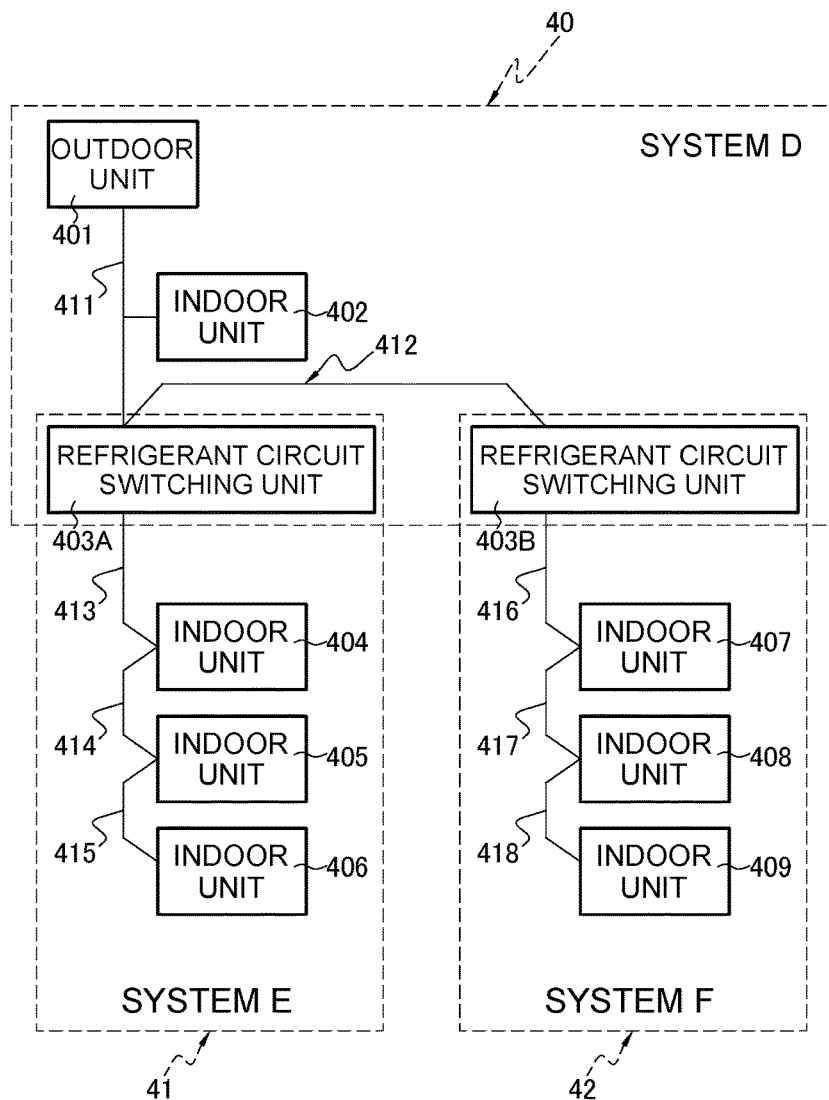
FIG. 5 is a configuration diagram of a cooling-heating simultaneous operation air conditioning system.

(3) Application to Cooling-Heating Simultaneous Operation Air Conditioning System FIG. 5 is a configuration diagram of a cooling-heating simultaneous operation air conditioning system. In FIG. 5, the cooling-heating simultaneous operation air conditioning system is constituted by an outdoor unit, indoor units, and refrigerant circuit switching units each switching a refrigerant circuit between the outdoor unit and the indoor units. FIG. 5 illustrates one refrigerant system. It is necessary for refrigerant control to identify the indoor units connected downstream of each refrigerant circuit switching unit, and thus it is necessary to perform system recognition by dividing the system into three sub-systems D, E, and F.

In the system D, an outdoor unit 401, an indoor unit 402, and refrigerant circuit switching units 403A and 403B serving as devices are connected by lines 411 and 412.

In the system E, the refrigerant circuit switching unit 403A and indoor units 404, 405, and 406 serving as devices are connected by lines 413, 414, and 415.

In the system F, the refrigerant circuit switching unit 403B and indoor units 407, 408, and 409 serving as devices are connected by lines 416, 417, and 418.

The refrigerant circuit switching unit 403A connects the system D and the system E, and the refrigerant circuit switching unit 403B connects the system D and the system F.

All the devices form one communication network. Communication between the individual devices is performed using a high frequency of 100 kHz or more.

In FIG. 5, the outdoor unit 401 of the system D, the refrigerant circuit switching unit 403A of the system E, and the refrigerant circuit switching unit 403B of the system F can become a "recognizer" in this refrigerant system.

One "recognizer" is selected from among the one outdoor unit 401 and the two refrigerant circuit switching units 403A and 403B. System recognition may be started from any system. For the sake of convenience, a description will be given in the order of the system D, the system E, and the system F.

(3-1) System D

For example, it is assumed that the outdoor unit 401 is selected as a "recognizer". In this case, the refrigerant circuit switching units 403A and 403B that are not selected as a "recognizer" temporarily become "objects to be recognized".

Subsequently, the outdoor unit 401 serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the indoor unit 402 and the refrigerant circuit switching units 403A and 403B of the identical system, and the detection signal must not be transmitted to the indoor units 404, 405, and 406 disposed downstream of the refrigerant circuit switching unit 403A and to the indoor units 407, 408, and 409 disposed downstream of the refrigerant circuit switching unit 403B.

Subsequently, the indoor unit 402 and the refrigerant circuit switching units 403A and 403B serving as "objects to be recognized" that have received the detection signal each transmit a response by communication.

The outdoor unit 401 serving as a "recognizer" recognizes that the indoor unit 402 and the refrigerant circuit switching units 403A and 403B serving as "objects to be recognized" from which responses have been received are devices belonging to the identical system, and stores information thereof.

(3-2) System E

The outdoor unit 401 that has already been selected as a "recognizer" is excluded from candidates for the next "recognizer", and thus one "recognizer" is selected from among the two refrigerant circuit switching units 403A and 403B.

For example, if the refrigerant circuit switching unit 403A is selected as a "recognizer", the refrigerant circuit switching unit 403B that is not selected as a "recognizer" temporarily becomes an "object to be recognized".

Subsequently, the refrigerant circuit switching unit 403A serving as a "recognizer" transmits a detection signal for system recognition. A recognition signal having a low frequency of 10 kHz or less is used as the detection signal. The recognition signal having a low frequency includes a DC (0 Hz) signal.

At this time, the detection signal is transmitted only to the indoor units 404, 405, and 406 of the identical system, and the detection signal must not be transmitted to the indoor units 407, 408, and 409 disposed downstream of the refrigerant circuit switching unit 403B.

Subsequently, the indoor units 404, 405, and 406 serving as "objects to be recognized" that have received the detection signal each transmit a response by communication.

The refrigerant circuit switching unit 403A serving as a "recognizer" recognizes that the indoor units 404, 405, and 406 serving as "objects to be recognized" from which responses have been received are devices belonging to the identical system, and stores information thereof.

(3-3) System F

The outdoor unit 401 and the refrigerant circuit switching unit 403A that have already been selected as a "recognizer" are excluded from candidates for the next "recognizer", and thus the refrigerant circuit switching unit 403B becomes a "recognizer".

Subsequently, the refrigerant circuit switching unit 403B serving as a "recognizer" transmits a detection signal for system recognition to the indoor units 407, 408, and 409 serving as "objects to be recognized". A recognition signal having a low frequency of 10 kHz or less is used as the detection signal. The recognition signal having a low frequency includes a DC (0 Hz) signal.

At this time, the detection signal is transmitted only to the indoor units 407, 408, and 409 of the identical system, and the detection signal must not be transmitted to the indoor units 404, 405, and 406 disposed downstream of the refrigerant circuit switching unit 403A.

Subsequently, the indoor units 407, 408, and 409 serving as "objects to be recognized" that have received the detection signal each transmit a response by communication.

The refrigerant circuit switching unit 403B serving as a "recognizer" recognizes that the indoor units 407, 408, and 409 serving as "objects to be recognized" from which responses have been received are devices belonging to the identical system, and stores information thereof.

(4) Method of System Recognition

In the present application, high-frequency communication is adopted for communication, and a low-frequency signal having a frequency sufficiently away from the frequency used for communication is used as a signal for system recognition. This is referred to as a low-frequency signal detection method. In this method, a low-frequency signal is transmitted only to devices in an identical refrigerant system, and this is detected to recognize the devices in the identical system.

Figure 6:
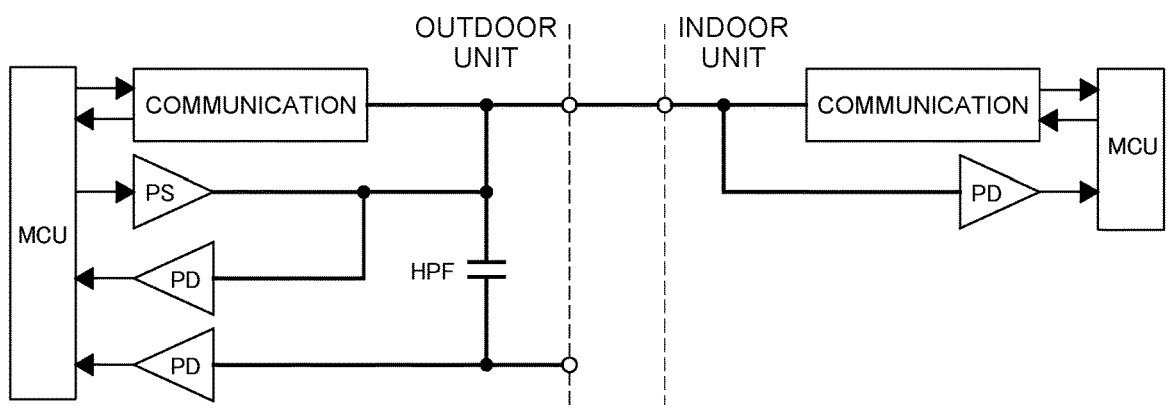
FIG. 6 is a circuit block diagram of a low-frequency signal detection method.

FIG. 6 is a circuit block diagram of a low-frequency signal detection method. One device (for example, an outdoor unit) is provided with a low-frequency signal transmitting circuit PS, two low-frequency signal receiving circuits PD, and a high pass filter HPF that inhibits transmission of a low-frequency signal and passes a high-frequency signal. The other device (for example, an indoor unit) is provided with a low-frequency signal receiving circuit PD.

The timing at which the outdoor unit transmits a low-frequency signal and the timing at which the indoor unit receives the low-frequency signal are coordinated each other, and the outdoor unit is notified that the indoor unit has detected the low-frequency signal. Accordingly, it can be recognized that both the devices are included in an identical refrigerant system.

(4-1) Case of Air Conditioning System

Figure 7:
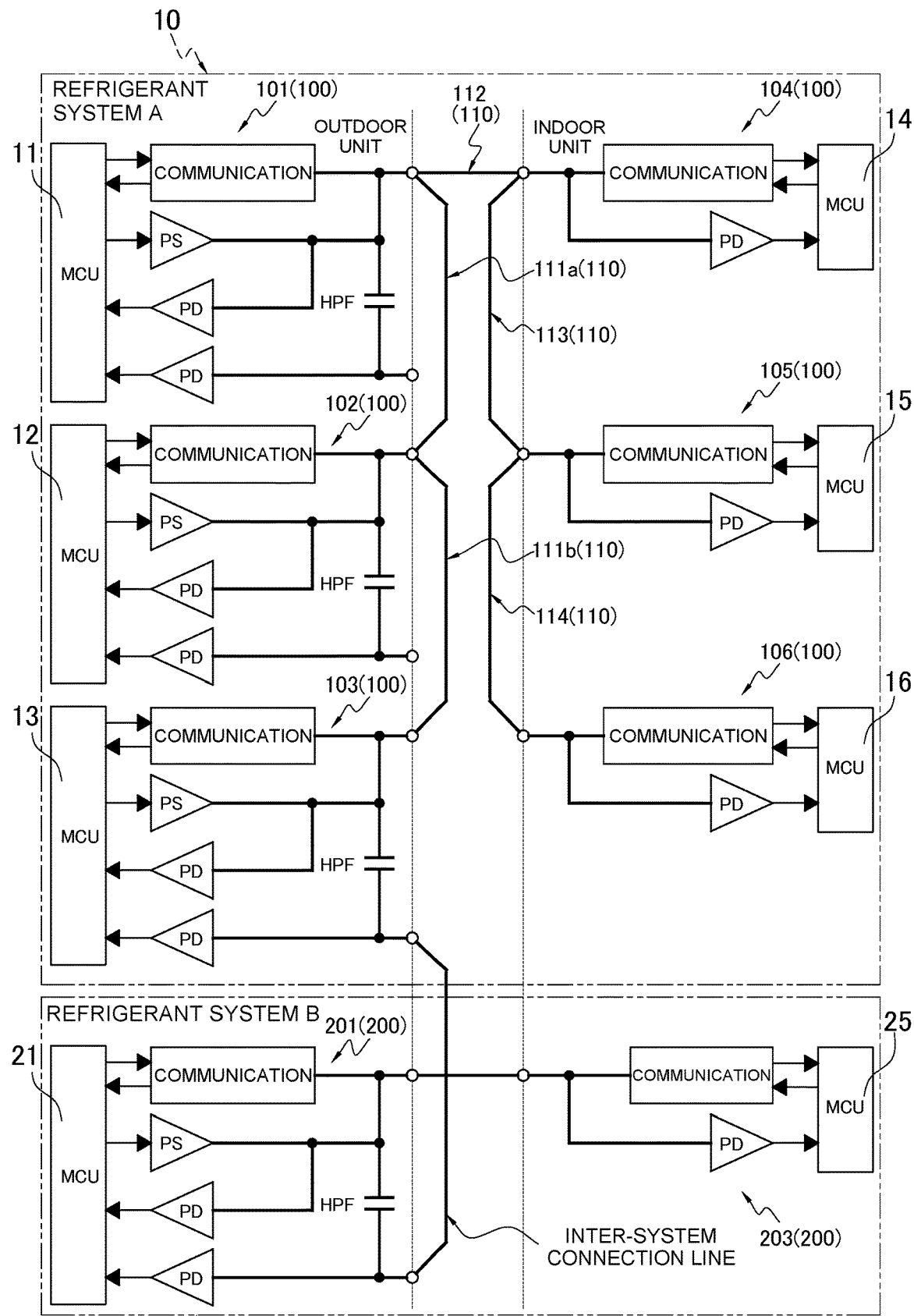
FIG. 7 is a circuit block diagram of the air conditioning system illustrated in FIG. 4.

FIG. 7 is a circuit block diagram of the air conditioning system illustrated in FIG. 4. For the sake of convenience, the refrigerant system A and part of the refrigerant system B are illustrated. In FIG. 7, the inter-system connection line has high pass filters HPF inserted thereinto, and thus a high-frequency communication signal passes therethrough. However, a low-frequency signal is prevented from being transmitted to the other systems.

Figure 8:
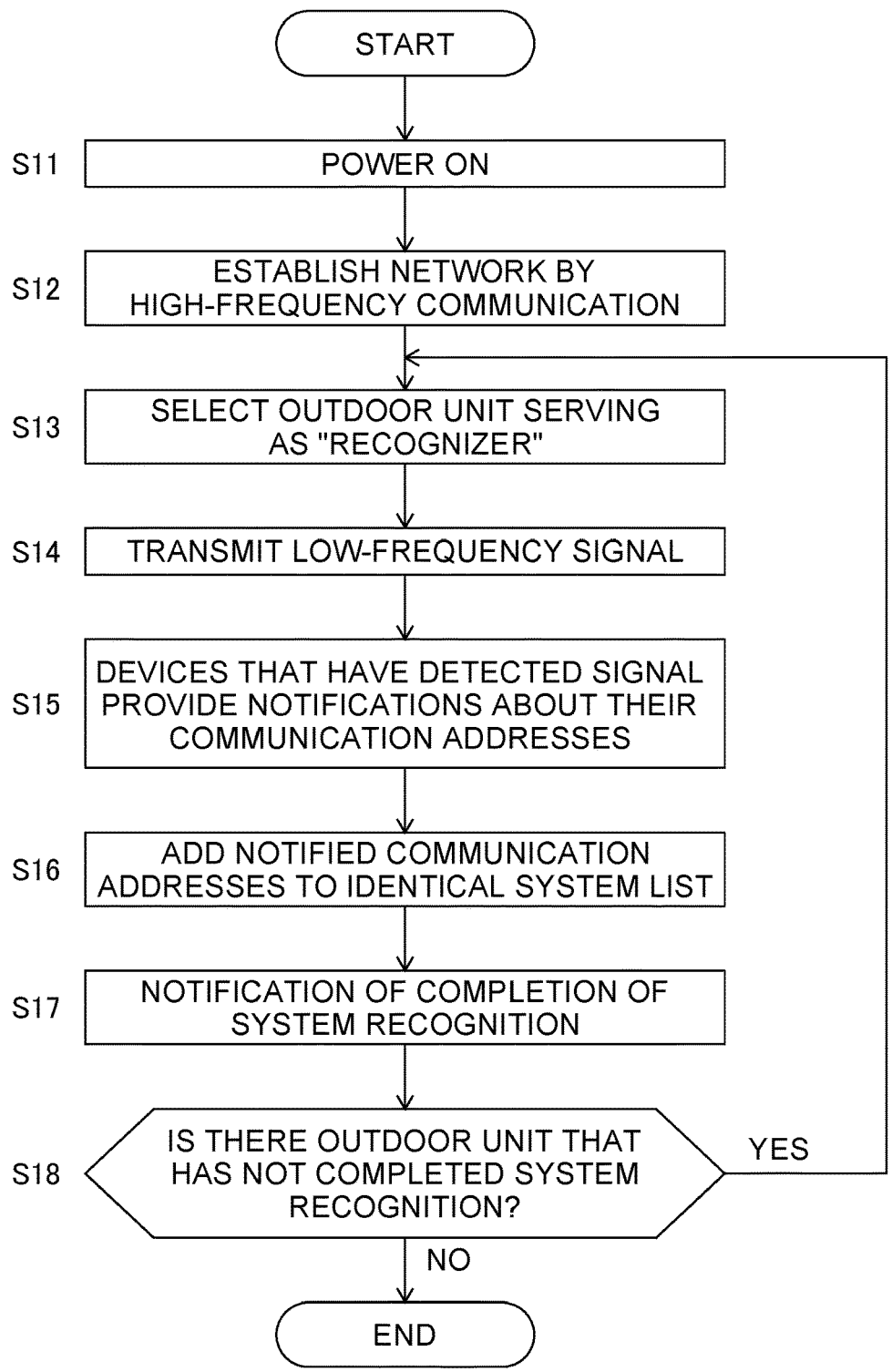
FIG. 8 is a flowchart of system recognition.

FIG. 8 is a flowchart of system recognition. Hereinafter, a procedure of system recognition will be described with reference to FIG. 7 and FIG. 8.

(Step S11)

Referring to FIG. 7 and FIG. 8, power is turned on in step S11.

(Step S12)

Subsequently, a network is established by high-frequency communication. Each device (outdoor unit, indoor unit) has a high-frequency communication circuit (see FIG. 7) and establishes a network by communication after power on.

(Step S13)

Subsequently, to recognize an outdoor unit and an indoor unit of an identical system, all the outdoor units cooperate with each other by communication and select one outdoor unit in the network as a "recognizer".

(Step S14)

The selected outdoor unit 101 notifies all the devices (the outdoor units 102, 103, and 201 and the indoor units 104, 105, 106, and 203) that a low-frequency signal is to be transmitted, and transmits a low-frequency signal from the low-frequency signal transmitting circuit PS. At the time of the notification, the selected outdoor unit 101 also provides a notification about an ID or communication address unique to the outdoor unit 101.

(Step S15)

After the notification from the selected outdoor unit 101, the outdoor units 102 and 103 and the indoor units 104, 105, and 106 that have detected the low-frequency signal provide notifications about their IDs or communication addresses to the ID or communication address notified in advance.

(Step S16)

The selected outdoor unit 101 adds the notified IDs or communication addresses to an identical system list.

(Step S17)

The selected outdoor unit 101 notifies the entire network that system recognition has been completed.

(Step S18)

If there is an outdoor unit that has not completed system recognition, the process returns to step S13, an outdoor unit that executes the next system recognition is selected in cooperation, and the process from step S13 to step S17 is performed.

(4-2) Case of Cooling-Heating Simultaneous Operation Air Conditioning System

The case of a cooling-heating simultaneous operation air conditioning system can be described by using FIG. 7. The details of step S11 and step S12 are the same as those described in "(4-1) Case of Air Conditioning System", and thus the description thereof is omitted. The details corresponding to step S13 to step S18 will be described as step S13B to step S18B.

(Step S13B)

In FIG. 5, the system D includes the one outdoor unit 401 and the two refrigerant circuit switching units 403A and 403B. Thus, a device serving as a "recognizer" is selected from among them. Hereinafter, a description will be given under the assumption that the outdoor unit 401 is selected as the first "recognizer".

(Step S14B)

Subsequently, the selected outdoor unit 401 notifies all the devices (the indoor units 402, 404, 405, 406, 407. 408, and 409, and the refrigerant circuit switching units 403A and 403B) that a low-frequency signal is to be transmitted, and transmits a low-frequency signal from the low-frequency signal transmitting circuit PS. At the time of the notification, the selected outdoor unit 401 also provides a notification about an ID or communication address unique to the outdoor unit 401.

(Step S15B)

After the notification from the selected outdoor unit 401, the indoor unit 402 and the refrigerant circuit switching units 403A and 403B that have detected the low-frequency signal provide notifications about their IDs or communication addresses to the ID or communication address notified in advance.

(Step S16B)

The selected outdoor unit 401 adds the notified IDs or communication addresses to an identical system list.

(Step S17B)

The selected outdoor unit 401 notifies the entire network that system recognition has been completed.

(Step S18B)

If there is a device (refrigerant circuit switching unit) that has not completed system recognition, the process returns to step S13B, a device that executes the next system recognition is selected in cooperation, and the process from step S13B to step S17B is performed.

(5) Process in a Case where Presence of Device Outside System is Detected During System Recognition Here, a description will be given of a processing method in a case where capacitive or inductive coupling between systems occurs and the presence of a device outside the system is detected during system recognition. For the sake of convenience, a description will be given by assuming two refrigerant systems and networks each being formed for a corresponding one of the refrigerant systems.

Figure 9A:
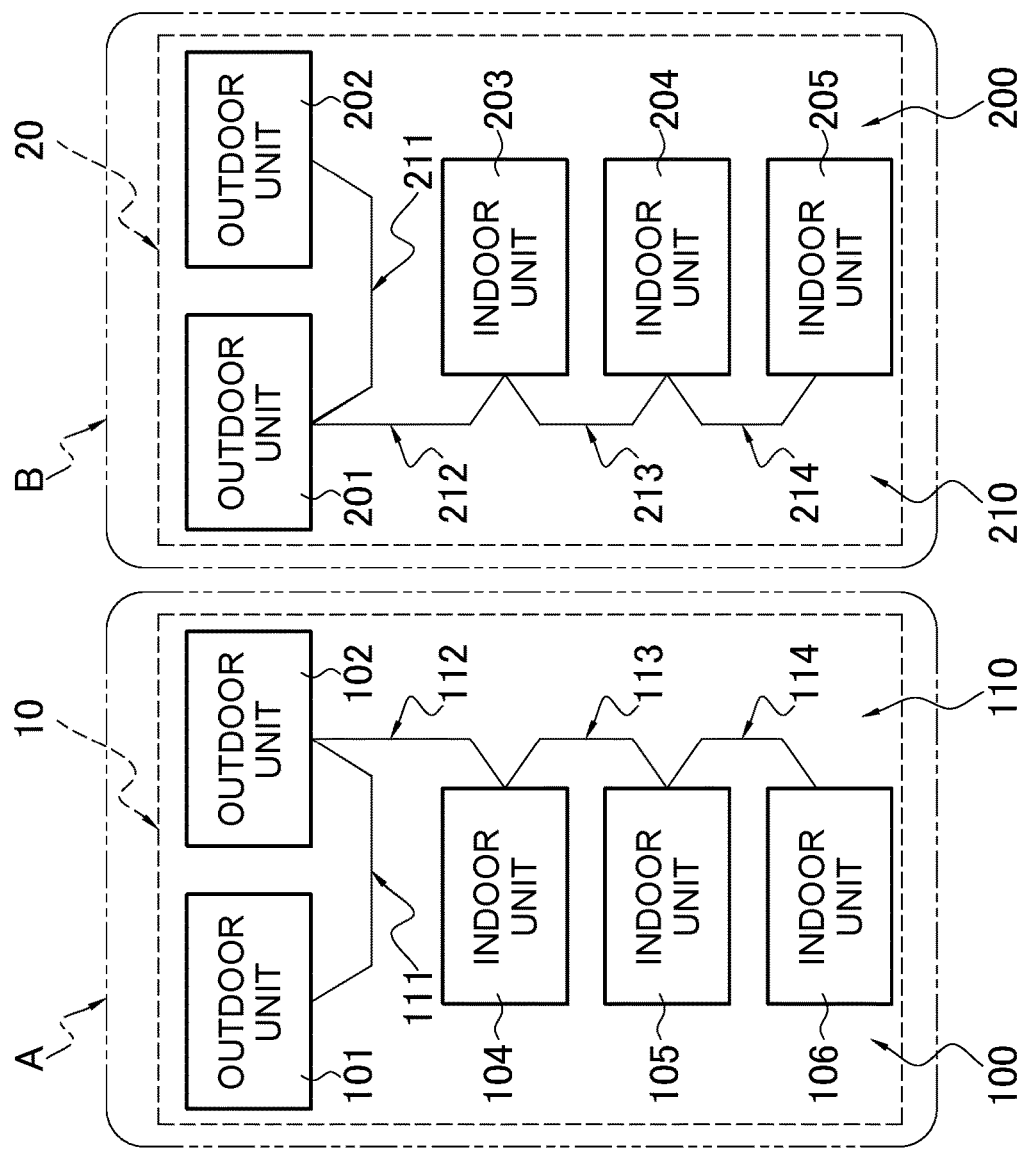
FIG. 9A is a configuration diagram of a state in which networks of devices are normally formed in an air conditioning system including two refrigerant systems.

FIG. 9A is a configuration diagram of a state in which networks of devices are normally formed in an air conditioning system including two refrigerant systems.

Referring to FIG. 9A, in the refrigerant system A, the outdoor units 101 and 102 and the indoor units 104, 105, and 106 are connected by the lines 111, 112, 113, and 114, and the devices connected by the line group form a first network 10.

In the refrigerant system B, the outdoor units 201 and 202 and the indoor units 203, 204, and 205 are connected by the lines 211, 212, 213, and 214, and the devices connected by the line group form a second network 20.

(5-1) First State in which Crosstalk Occurs

Figure 9B:
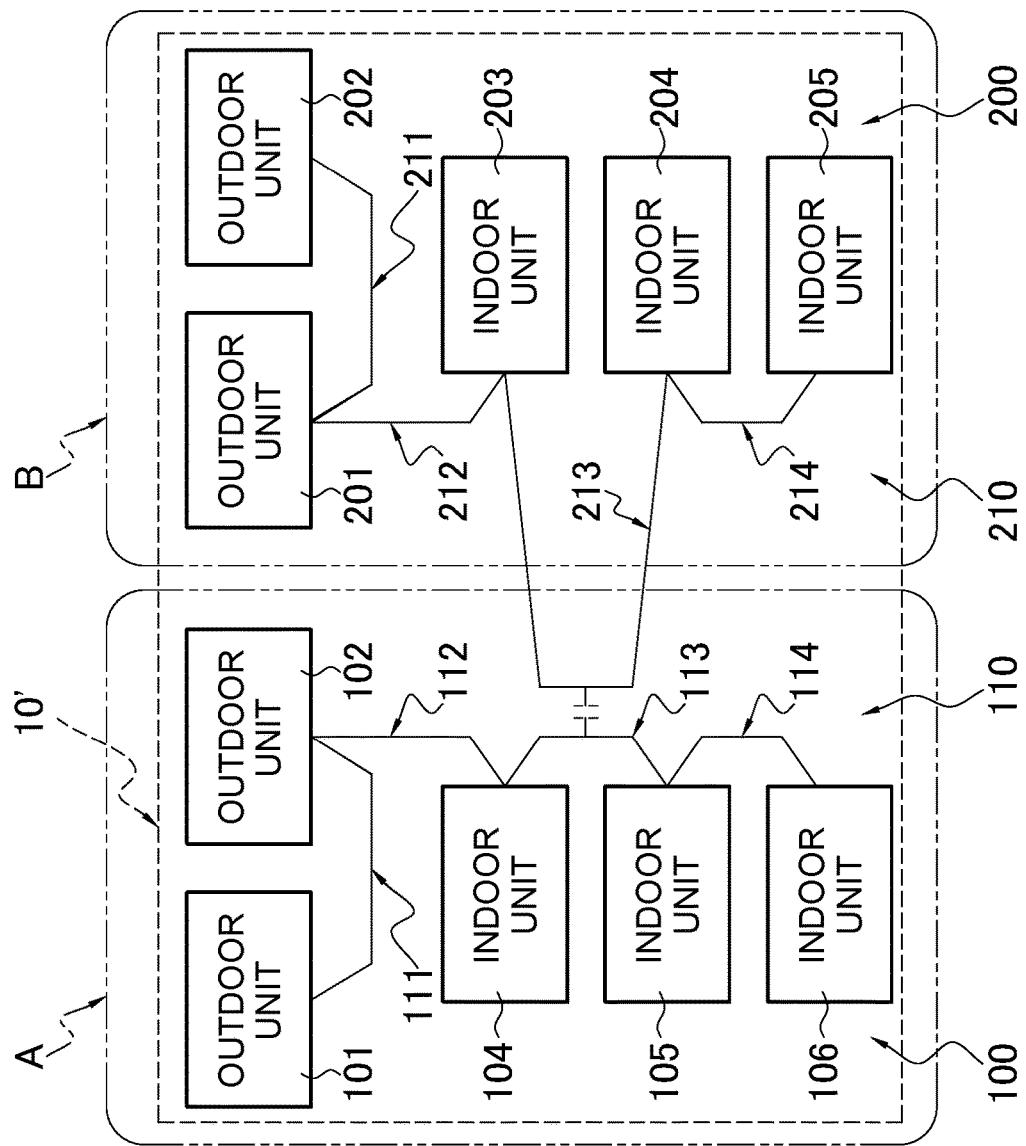
FIG. 9B is a configuration diagram of a state in which the two networks in FIG. 9A are coupled into one network.

FIG. 9B is a configuration diagram of a state in which the two networks in FIG. 9A are coupled into one network.

In FIG. 9B, the lines of the refrigerant system A and the refrigerant system B are close to each other and thus capacitive or inductive coupling occurs. As a result of a communication signal being transmitted to the other system due to crosstalk, the second network 20 couples to the first network 10 to form one first network 10'.

In this state, a device of the refrigerant system A is capable of communicating with a device of the refrigerant system B. If the system to which a device belongs can be set or can be detected by detection means, it is equivalent to a state in which devices are connected by an inter-system connection line, and thus no problem occurs in controlling air conditioners. However, if the coupling of crosstalk is weak, the amount of signal attenuation is large and communication quality decreases at a coupling portion of crosstalk. As a result, the processing ability per unit time of the entire network decreases.

(5-2) Second State in which Crosstalk Occurs

Figure 9C:
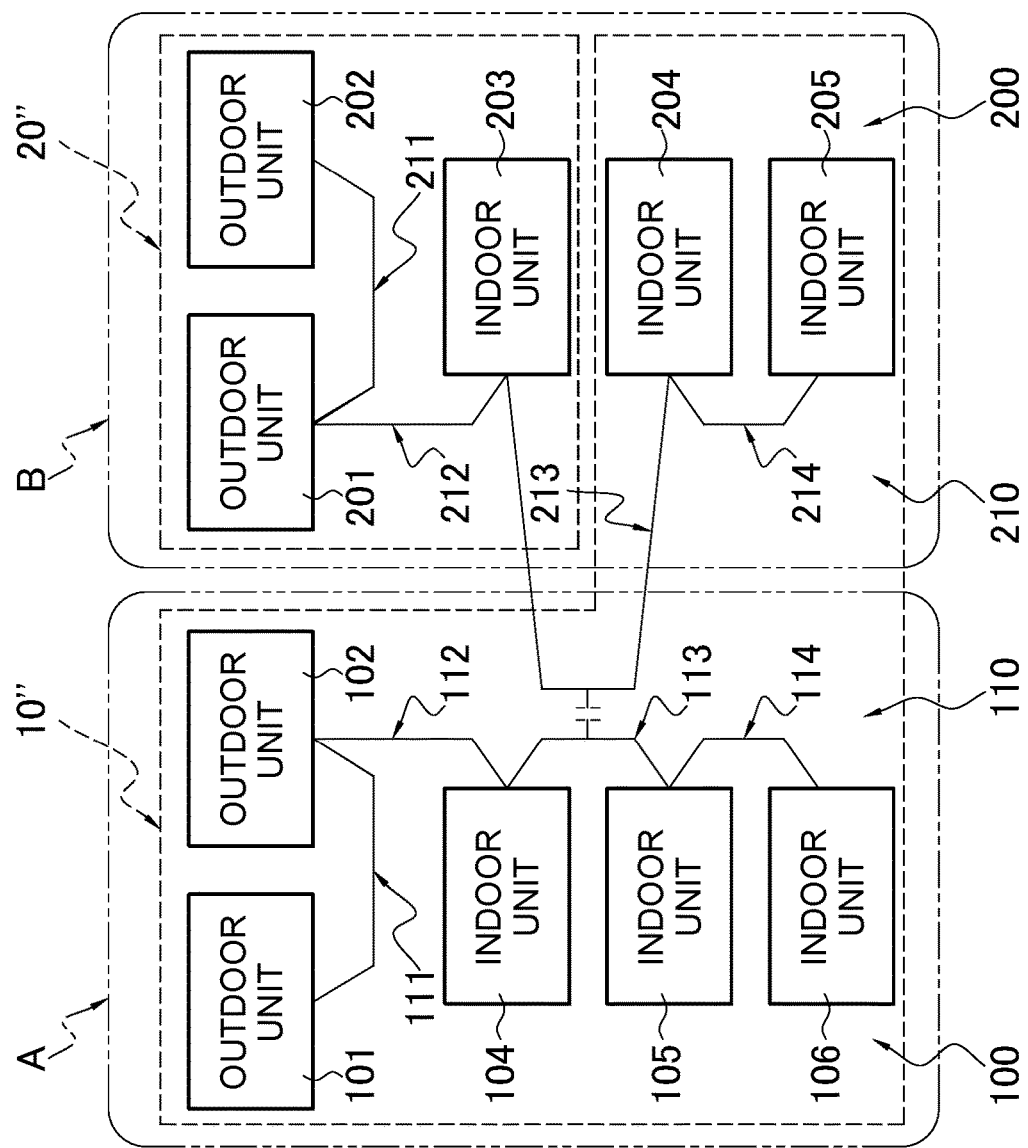
FIG. 9C is a configuration diagram of a state in which some of the devices in FIG. 9A couple to the other network and two networks having a configuration different from the original configuration are formed.

FIG. 9C is a configuration diagram of a state in which some of the devices in FIG. 9A couple to the other network and two networks having a configuration different from the original configuration are formed.

In FIG. 9C, the lines of the refrigerant system A and the refrigerant system B are close to each other and thus capacitive or inductive coupling occurs. As a result of a communication signal being transmitted to the network of the other system due to crosstalk, some of the devices in the second network 20 (the indoor units 204 and 205) couple to the first network 10, and a virtual first network 10" and a virtual second network 20" are formed with a connection configuration different from the original connection configuration of the refrigerant systems.

Such networks are formed when communication adopts a master/slave protocol. This may occur as a result of a plurality of masters taking slaves under constraints that there is only one master in one network.

In this case, in the refrigerant system B, communication between the outdoor units 201 and 202 and the indoor units 204 and 205 is impossible and uncontrollable.

(5-3) Decoupling of Networks

To decouple the above-described networks coupled by crosstalk, it is necessary to determine that the networks and the refrigerant systems are in a mismatch state, cause a device in a mismatch state to leave the network to which the device belongs, search for another network, and connects the device to the network.

As means therefor, two types of methods can be considered, a method of setting the system to which a device belongs and a method of detecting a mismatch state by detection means.

(5-3-1) Method of Detecting Mismatch State

In system recognition, a low-frequency detection signal is transmitted to a device in an identical system, and the device that has received the detection signal responds by high-frequency communication. Thus, system recognition is performed after a communication network has been established.

As described in "(4) Method of System Recognition", each outdoor unit and each indoor unit have a high-frequency communication circuit, and establish a network after power on.

A device participating in a network is capable of acquiring a unique ID or communication address by communication.

After all system recognition processes have been completed, a list of devices that have been subjected to system recognition is obtained. A device that is present in a communication network but is not recognized by system recognition and is absent in the list leaves or is caused to leave the communication network.

For example, in FIG. 9C, even if a state occurs in which the indoor units 204 and 205 of the refrigerant system B are recognized as being in the network of the refrigerant system A due to capacitive or inductive coupling, a device selected as a "recognizer" (for example, the outdoor unit 101) performs system recognition and notifies the entire network that system recognition has been completed. At that time, the indoor units 204 and 205 recognize that the indoor units 204 and 205 have not been recognized, and leave the network.

(5-3-2) Method of Setting System to which Device Belongs

Crosstalk may occur due to movement of a line or the like after a network has been established, even if crosstalk does not occur during establishment of the network. For example, if lines are made close to each other and crosstalk occurs, a network is reestablished.

In this case, an identical system list has been created by the latest system recognition, and thus a device that is not registered in the list may be caused to leave after system recognition is performed again.

(6) Features (6-1)

In a device network system, in a state in which a first device group is set in advance as a physically connectable system or in a state in which the first device group is recognized as a physically connectable system, in a case where the first device group or a second device detects occurrence of a state in which the second device outside the system is recognized as belonging to the system, the first device group or the second device causes the second device to leave the system. As a result, a network can be normally maintained even in high-frequency communication.

(6-2)

In the first device group, a main device (for example, an outdoor unit) selected from among a plurality of devices determines whether the state in which the second device (for example, an indoor unit) outside the own system is recognized as belonging to the system has occurred.

(6-3)

In the first device group, a main device (for example, an outdoor unit) selected from among the plurality of devices determines, using a low-frequency signal, whether the plurality of devices except for the main device belong to the physically connectable identical system.

(6-4)

An action performed by the first device group or the second device under the assumption that the second device does not belong to the identical system includes an action of denying belonging of the second device to the identical system.

(6-5)

In the first device group, a main device (for example, an outdoor unit) selected from among the plurality of devices denies belonging of the second device outside the system to the identical system.

The embodiment of the present disclosure has been described above. It is to be understood that the embodiment and the details can be variously changed without deviating from the gist and scope of the present disclosure described in the claims.

REFERENCE SIGNS LIST

10 first network
101, 102, 103 outdoor unit (first device)
104, 105, 106 indoor unit (first device)
100 first device group
110 first line group
20 second network
201, 202 outdoor unit (second device)
203, 204, 205 indoor unit (second device)
200 second device group
212, 213, 214 second line

CITATION LIST

Patent Literature

[PTL 1] Japanese Unexamined Patent Application Publication No. 2016-219983

The invention claimed is:

1. A device network system comprising:
a first network including a first device group and a first line group, the first device group including a plurality of devices, the first line group being connected to the plurality of devices; and
a second network including a second device and a second line connected to the second device, the second device being physically separated from the first network, wherein
in a state in which the first device group is set in advance as a physically connectable group or in a state in which the first device group is recognized as a physically connectable group, in a case where the first device group detects occurrence of a state in which the second device is recognized as belonging to the physically connectable group associated with the first device group due to a presence of crosstalk that occurs between the first network and second network, the first device group or the second device performs an action under an assumption that the second device does not belong to the physically connectable group, in the first device group, a main device selected from among the plurality of devices determines, using low-frequency communication, whether the plurality of devices except for the main device belong to the physically connectable group.

2. The device network system according to claim 1, wherein in the first device group, the main device selected from among the plurality of devices determines whether the state in which the second device is recognized as belonging to the physically connectable group has occurred.

3. The device network system according to claim 2, wherein the action performed by the first device group or the second device under the assumption that the second device does not belong to the physically connectable group includes an action of denying belonging of the second device to the physically connectable group.

4. The device network system according to claim 1, wherein the action performed by the first device group or the second device under the assumption that the second device does not belong to the physically connectable group includes an action of denying belonging of the second device to the physically connectable group.

5. The device network system according to claim 4, wherein in the first device group, the main device selected from among the plurality of devices denies belonging of the second device to the physically connectable group.

\* \* \* \* \*